US012726822B2

(12) United States Patent
Das et al.

(10) Patent No.: US 12,726,822 B2
(45) Date of Patent: Sep. 1, 2026

(54) ENHANCED INTERCONNECTION BETWEEN CELLULAR COMMUNICATION NETWORKS

(71) Applicant: Nokia Technologies Oy, Espoo (FI)

(72) Inventors: Prashanti Das, Bangalore (IN); Saurabh Khare, Bangalore (IN); Bruno Landais, Pleumeur-Bodou (FR)

(73) Assignee: Nokia Technologies Oy, Espoo (FI)

( * ) Notice: Subject to any disclaimer, the term of this patent is extended or adjusted under 35 U.S.C. 154(b) by 500 days.

(21) Appl. No.: 18/189,457

(22) Filed: Mar. 24, 2023

(65) Prior Publication Data

US 2023/0319569 A1 Oct. 5, 2023

(30) Foreign Application Priority Data

Mar. 29, 2022 (IN) ............................ 202241018384

(51) Int. Cl.
*H04W 12/088* (2021.01)
*H04W 84/04* (2009.01)

(52) U.S. Cl.
CPC ........ *H04W 12/088* (2021.01); *H04W 84/042* (2013.01)

(58) Field of Classification Search
CPC .............. H04W 12/088; H04W 84/042; H04L 63/0227; H04L 63/0281; H04L 63/205
(Continued)

(56) References Cited

U.S. PATENT DOCUMENTS 11,076,281 B1 7/2021 Yau et al.
11,533,358 B1 * 12/2022 Khare .................... H04L 69/22
(Continued)

FOREIGN PATENT DOCUMENTS

CN 112136301 A 12/2020
CN 112584371 A 3/2021
(Continued)

OTHER PUBLICATIONS

PLMN Specific N32-C connection_ Nokia_ 3GPP TSG-CT WG4 Meeting _C4-221116 (Year: 2022).*
(Continued)

*Primary Examiner* — Mahendra R Patel
(74) *Attorney, Agent, or Firm* — Brake Hughes Bellermann LLP

(57) ABSTRACT

According to an example aspect of the present disclosure, there is provided an apparatus comprising at least one processing core, at least one memory including computer program code, the at least one memory and the computer program code being configured to, with the at least one processing core, cause the apparatus to perform at least one of: transmit to a second security edge protection proxy (SEPP) of a second public land mobile network (PLMN), in a control plane signaling procedure, addressing information of a first SEPP of a first PLMN, to be used by the second SEPP for forwarding messages from the second PLMN to the first PLMN and receive from the second SEPP of the second PLMN, in the control plane signaling procedure, addressing information of the second SEPP of the second PLMN, to be used by the first SEPP for forwarding messages from the first PLMN to the second PLMN.

6 Claims, 4 Drawing Sheets

(58) Field of Classification Search
USPC .......................................................... 455/410
See application file for complete search history.

(56) References Cited

U.S. PATENT DOCUMENTS

| | | | | |
|---|---|---|---|---|
| 11,652,782 | B1 * | 5/2023 | Goel | H04L 61/4511 709/245 |
| 2019/0253885 | A1 * | 8/2019 | Bykampadi | H04L 63/0272 |
| 2021/0136849 | A1 * | 5/2021 | Nimmala | H04W 68/005 |
| 2021/0282078 | A1 | 9/2021 | Martinez De La Cruz et al. | |
| 2021/0297935 | A1 | 9/2021 | Belling et al. | |
| 2022/0014939 | A1 * | 1/2022 | Colom Ikuno | H04W 8/12 |
| 2022/0132369 | A1 * | 4/2022 | Maheshwari | H04W 48/18 |
| 2022/0158847 | A1 * | 5/2022 | Aggarwal | H04W 12/069 |
| 2022/0248229 | A1 * | 8/2022 | Bharathi Somashekar | H04L 63/205 |

FOREIGN PATENT DOCUMENTS

| | | | | |
|---|---|---|---|---|
| CN | 113039765 | A | 6/2021 | |
| CN | 113438268 | A | 9/2021 | |
| CN | 113497825 | A | 10/2021 | |
| CN | 113661696 | A | 11/2021 | |
| CN | 113994625 | A | 1/2022 | |
| EP | 3886502 | A1 * | 9/2021 | H04L 45/00 |
| EP | 4106375 | A1 * | 12/2022 | H04W 12/12 |
| WO | WO-2020151614 | A1 * | 7/2020 | H04L 9/40 |
| WO | 2021099676 | A1 | 5/2021 | |

OTHER PUBLICATIONS

"3rd Generation Partnership Project; Technical Specification Group Core Network and Terminals; 5G System; Public Land Mobile Network (PLMN) Interconnection; Stage 3 (Release 17)", 3GPP TS 29.573, V17.3.0, Dec. 2021, pp. 1-102.

"3rd Generation Partnership Project; Technical Specification Group Services and System Aspects; Security architecture and procedures for 5G system (Release 17)", 3GPP TS 33.501, V17.4.2, Jan. 2022, pp. 1-287.

"3rd Generation Partnership Project; Technical Specification Group Services and System Aspects; System architecture for the 5G System (5GS); Stage 2 (Release 17)", 3GPP TS 23.501, V17.3.0, Dec. 2021, pp. 1-559.

"3rd Generation Partnership Project; Technical Specification Group Core Network and Terminals; Numbering, addressing and identification; (Release 17)", 3GPP TS 23.003, V17.5.0, Mar. 2022, pp. 1-146.

Extended European Search Report received for corresponding European Patent Application No. 23156465.9, dated Jul. 31, 2023, 13 pages.

"PLMN Specific N32-C connection", 3GPP TSG-CT WG4 Meeting #108-e, C4-221542, Nokia, Feb. 17-25, 2022, 6 pages.

"3rd Generation Partnership Project; Technical Specification Group Core Network and Terminals; 5G System; Public Land Mobile Network (PLMN) Interconnection; Stage 3 (Release 17)", 3GPP TS 29.573, V17.1.0, Jun. 2021, pp. 1-102.

"Load control and overload control for SEPP", 3GPP TSG-CT WG4 Meeting #103-e, C4-212439, Huawei, Apr. 14-24, 2021, 11 pages.

Office Action for Chinese Patent Application No. 202310311481.7, mailed on Apr. 11, 2026, 16 pages.

3GPP TSG-CT Meeting #95, CP-220080; "Enhancements on PLMN Interconnect N32"; Online; Mar. 14-16, 2022; 17 pages.

3GPP TSG-CT WG4 Meeting #108-e, C4-221542; "PLMN Specific N32-C Connection"; E-Meeting; Feb. 17-25, 2022; 6 pages.

3GPP TSG-CT WG4 Meeting #105-e, C4-214329; "PLMN Specific N32-C Connection"; E-Meeting; Aug. 17-27, 2021; 6 pages.

3GPP TSG CT WG4 Meeting #85bis, C4-185052; "Discussion on TLS and Inter PLMN Routing through SEPP"; Sophia Antipolis, France; Jul. 9-13, 2018; 6 pages.

SA WG2 Meeting #135, S2-1909572; "Introduction of the Inter PLMN Up functionality in the architecture"; Split, HR; Oct. 14-18, 2019; 14 pages.

3GPP TSG-CT WG4 Meeting #105-e, C4-214088; "Requester PLMN"; E-Meeting; Aug. 17-27, 2021; 14 pages.

* cited by examiner

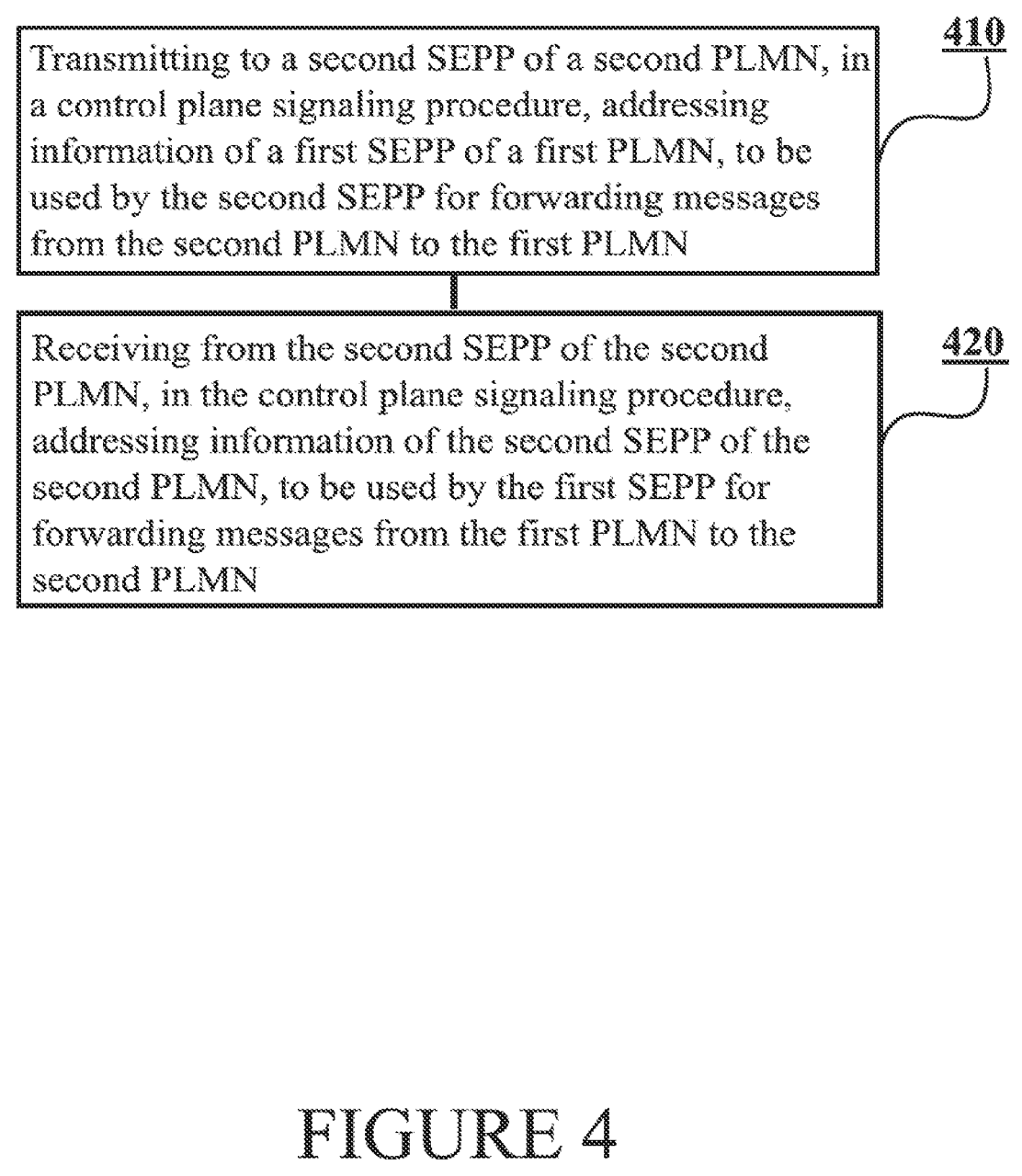

410

Transmitting to a second SEPP of a second PLMN, in a control plane signaling procedure, addressing information of a first SEPP of a first PLMN, to be used by the second SEPP for forwarding messages from the second PLMN to the first PLMN

420

Receiving from the second SEPP of the second PLMN, in the control plane signaling procedure, addressing information of the second SEPP of the second PLMN, to be used by the first SEPP for forwarding messages from the first PLMN to the second PLMN

FIGURE 4

ENHANCED INTERCONNECTION BETWEEN CELLULAR COMMUNICATION NETWORKS

FIELD

Various example embodiments relate in general to communication networks, such as core networks of cellular communication systems, and more specifically, to interconnection between such networks.

BACKGROUND

Interconnections between various communication networks are needed to enable communications from one network to another. Proper security measures need to be in place for such communications and Security Edge Protection Proxies, SEPPs, may be used to ensure secure interconnection between communication networks, such as cellular communication networks, like Public Land Mobile Networks, PLMNs. Proper security measures need to be ensured for example between Public Land Mobile Networks, PLMNs, of cellular communication systems, such as between networks developed by the 3rd Generation Partnership Project, 3GPP. The 3GPP still develops 5G and there is a need to provide improved methods, apparatuses and computer programs for enhancing interconnection between PLMNs. Such enhancements may be useful in other communication networks as well.

SUMMARY

According to some aspects, there is provided the subject-matter of the independent claims. Some example embodiments are defined in the dependent claims.

According to an aspect of the present disclosure, there is provided an apparatus comprising at least one processing core, at least one memory including computer program code, the at least one memory and the computer program code being configured to, with the at least one processing core, cause the apparatus at least to transmit to a second security edge protection proxy (SEPP) of a second public land mobile network (PLMN), in a control plane signaling procedure, addressing information of a first SEPP of a first PLMN, to be used by the second SEPP for forwarding messages from the second PLMN to the first PLMN and receive from the second SEPP of the second PLMN, in the control plane signaling procedure, addressing information of the second SEPP of the second PLMN, to be used by the first SEPP for forwarding messages from the first PLMN to the second PLMN.

Embodiments of the aspect may comprise at least one feature from the following bulleted list or any combination of the following features:

- wherein the at least one memory and the computer program code are configured to, with the at least one processing core, further cause the apparatus to receive a message from the second SEPP via a forwarding interface by using the addressing information of the first SEPP and/or transmit a message to the second SEPP via the forwarding interface by using the addressing information of the second SEPP;
- wherein the control plane signaling procedure is a security capability negotiation procedure;
- wherein the addressing information comprises a fully qualified domain name or an Internet Protocol address.

According to an aspect of the present disclosure, there is provided an apparatus comprising at least one processing core, at least one memory including computer program code, the at least one memory and the computer program code being configured to, with the at least one processing core, cause the apparatus at least to transmit, to a second SEPP of a second PLMN, in a control plane signaling procedure, addressing information of a first list of backup or alternative SEPPs of a first PLMN, to be used by the second SEPP for control plane signaling and/or for message forwarding towards the first PLMN, whereby all the backup and alternative SEPPs of the first PLMN support serving the signaling association established between the first SEPP and the second SEPP and receive, from the second SEPP of the second PLMN, in the control plane signaling procedure, addressing information of a second list of backup or alternative SEPPs of the second PLMN, to be used by the first SEPP for control plane signaling and/or for message forwarding towards the second PLMN, whereby all the backup and alternative SEPPs of the second PLMN support serving the signaling association established between the first SEPP and the second SEPP.

Embodiments of the aspect may comprise at least one feature from the following bulleted list or any combination of the following features:

- receive a message, related to the signaling association established between the first SEPP and the second SEPP, from the second PLMN via a control plane interface or a forwarding interface by using the addressing information of the first list of backup or alternative SEPPs and/or transmit a message, related to the signaling association established between the first SEPP and the second SEPP, to the second PLMN via a control plane interface or a forwarding interface by using the addressing information of the second list of backup or alternative SEPPs;
- wherein the addressing information comprises a fully qualified domain name or an Internet Protocol address;
- wherein said SEPPs are configured to support functionalities of control plane SEPPs and user plane SEPPs.

According to an aspect of the present disclosure, there is provided an apparatus comprising at least one processing core, at least one memory including computer program code, the at least one memory and he computer program code being configured to, with the at least one processing core, cause the apparatus at least to operate as a control plane security edge protection proxy in a first public land mobile network without being configured to operate as a security edge protection proxy for user plane traffic and share, with a user plane security edge protection proxy of the first public land mobile network, a forwarding interface context to at least one other security edge protection proxy in a second public land mobile network, to enable the user plane security edge proxy of the first PLMN to support the forwarding of messages between the first and the second PLMNs.

Embodiments of the aspect may comprise at least one feature from the following bulleted list or any combination of the following features:

- wherein the at least one memory and the computer program code are configured to, with the at least one processing core, further cause the apparatus to communicate, over a control plane interface, with a control plane security edge protection proxy of a second public land mobile network without being configured to communicate to the second public land mobile network over a forwarding interface for user plane traffic;

wherein the at least one memory and the computer program code are configured to, with the at least one processing core, further cause the apparatus to share the forwarding interface context via a direct interface between the apparatus and the user plane security edge protection proxy or via a database.

According to an aspect of the present disclosure, there is provided an apparatus comprising at least one processing core, at least one memory including computer program code, the at least one memory and he computer program code being configured to, with the at least one processing core, cause the apparatus at least to operate as a user plane security edge protection proxy in a first public land mobile network without being configured to operate as a security edge protection proxy for control plane traffic and share, with a control plane security edge protection proxy of the first public land mobile network, a forwarding interface context to at least one other security edge protection proxy in a second public land mobile network.

Embodiments of the aspect may comprise at least one feature from the following bulleted list or any combination of the following features:

- wherein the at least one memory and the computer program code are configured to, with the at least one processing core, further cause the apparatus to send and/or receive, over the forwarding interface, messages using the addressing, security or protection policies requested by the control plane security edge proxy in the forwarding interface context;
- wherein the at least one memory and the computer program code are configured to, with the at least one processing core, further cause the apparatus to share the forwarding interface context via a direct interface between the apparatus and the control plane security edge protection proxy or via a database.

According to an aspect of the present disclosure, there is provided an apparatus comprising at least one processing core, at least one memory including computer program code, the at least one memory and the computer program code being configured to, with the at least one processing core, cause the apparatus to perform, build addressing information based on a public land mobile network of a peer security edge protection proxy, wherein said addressing information is to be used for communicating over a forwarding interface and communicate with the peer security edge protection proxy over the forwarding interface using said addressing information.

According to an aspect of the present disclosure, there is provided an apparatus comprising at least one processing core, at least one memory including computer program code, the at least one memory and the computer program code being configured to, with the at least one processing core, cause the apparatus at least to operate as a network repository function and receive, over an application programming interface, a request to register or discover a user plane security edge protection proxy and/or a control plane security edge protection proxy.

Embodiments of the aspect may comprise at least one feature from the following bulleted list or any combination of the following features:

- wherein the addressing information comprises a fully qualified domain name or an Internet Protocol address.

According to an aspect of the present disclosure, there is provided an apparatus comprising at least one processing core, at least one memory including computer program code, the at least one memory and the computer program code being configured to, with the at least one processing core, cause the apparatus to receive a message, related to the signaling association established between the first SEPP and the second SEPP, from the second PLMN via a control plane interface or a forwarding interface by using the addressing information of the first list of backup or alternative SEPPs.

According to an aspect of the present disclosure, there is provided a method comprising transmitting to a second security edge protection proxy (SEPP) of a second public land mobile network (PLMN), in a control plane signaling procedure, addressing information of a first SEPP of a first PLMN, to be used by the second SEPP for forwarding messages from the second PLMN to the first PLMN and receiving from the second SEPP of the second PLMN, in the control plane signaling procedure, addressing information of the second SEPP of the second PLMN, to be used by the first SEPP for forwarding messages from the first PLMN to the second PLMN.

Embodiments of the aspect may comprise at least one feature from the following bulleted list or any combination of the following features:

- receiving a message from the second SEPP via a forwarding interface by using the addressing information of the first SEPP and/or transmitting a message to the second SEPP via the forwarding interface by using the addressing information of the second SEPP;
- wherein the control plane signaling procedure is a security capability negotiation procedure;
- wherein the addressing information comprises a fully qualified domain name or an Internet Protocol address.

According to an aspect of the present disclosure, there is provided a method comprising transmitting, to a second SEPP of a second PLMN, in a control plane signaling procedure, addressing information of a first list of backup or alternative SEPPs of a first PLMN, to be used by the second SEPP for control plane signaling and/or for message forwarding towards the first PLMN, whereby all the backup and alternative SEPPs of the first PLMN support serving the signaling association established between the first SEPP and the second SEPP and receiving, from the second SEPP of the second PLMN, in the control plane signaling procedure, addressing information of a second list of backup or alternative SEPPs of the second PLMN, to be used by the first SEPP for control plane signaling and/or for message forwarding towards the second PLMN, whereby all the backup and alternative SEPPs of the second PLMN support serving the signaling association established between the first SEPP and the second SEPP.

Embodiments of the aspect may comprise at least one feature from the following bulleted list or any combination of the following features:

- receiving a message, related to the signaling association established between the first SEPP and the second SEPP, from the second PLMN via a control plane interface or a forwarding interface by using the addressing information of the first list of backup or alternative SEPPs and/or transmit a message, related to the signaling association established between the first SEPP and the second SEPP, to the second PLMN via a control plane interface or a forwarding interface by using the addressing information of the second list of backup or alternative SEPPs;
- wherein the addressing information comprises a fully qualified domain name or an Internet Protocol address;
- wherein said SEPPs are configured to support functionalities of control plane SEPPs and user plane SEPPs.

According to an aspect of the present disclosure, there is provided a method comprising operating an apparatus as a control plane security edge protection proxy in a first public land mobile network without being configured to operate as a security edge protection proxy for user plane traffic and sharing, by the apparatus, with a user plane security edge protection proxy of the first public land mobile network, a forwarding interface context to at least one other security edge protection proxy in a second public land mobile network, to enable the user plane security edge proxy of the first PLMN to support the forwarding of messages between the first and the second PLMNs.

Embodiments of the aspect may comprise at least one feature from the following bulleted list or any combination of the following features:

- communicating, over a control plane interface, with a control plane security edge protection proxy of a second public land mobile network without being configured to communicate to the second public land mobile network over a forwarding interface for user plane traffic;
- sharing the forwarding interface context via a direct interface between the apparatus and the user plane security edge protection proxy or via a database.

According to an aspect of the present disclosure, there is provided a method comprising operating an apparatus as a user plane security edge protection proxy in a first public land mobile network without being configured to operate as a security edge protection proxy for control plane traffic and sharing, by the apparatus, with a control plane security edge protection proxy of the first public land mobile network, a forwarding interface context to at least one other security edge protection proxy in a second public land mobile network.

Embodiments of the aspect may comprise at least one feature from the following bulleted list or any combination of the following features:

- sending and/or receiving, over the forwarding interface, messages using the addressing, security or protection policies requested by the control plane security edge proxy in the forwarding interface context;
- sharing the forwarding interface context via a direct interface between the apparatus and the control plane security edge protection proxy or via a database.

According to an aspect of the present disclosure, there is provided a method comprising building by an apparatus addressing information based on a public land mobile network of a peer security edge protection proxy, wherein said addressing information is to be used for communicating over a forwarding interface and communicate with the peer security edge protection proxy over the forwarding interface using said addressing information.

According to an aspect of the present disclosure, there is provided a method comprising operating an apparatus as a network repository function and receiving, by the apparatus, over an application programming interface, a request to register or discover a user plane security edge protection proxy and/or a control plane security edge protection proxy.

Embodiments of the aspect may comprise at least one feature from the following bulleted list or any combination of the following features:

- wherein the addressing information comprises a fully qualified domain name or an Internet Protocol address.

According to an aspect of the present disclosure, there is provided a method comprising receiving a message, related to the signaling association established between the first SEPP and the second SEPP, from the second PLMN via a control plane interface or a forwarding interface by using the addressing information of the first list of backup or alternative SEPPs.

According to a fifth aspect of the present disclosure, there is provided at least one apparatus, comprising means for performing at least one of said methods.

According to a sixth aspect of the present disclosure, there is provided non-transitory computer readable medium having stored thereon a set of computer readable instructions that, when executed by at least one processor, cause an apparatus to at least perform at least one of said methods. According to a seventh aspect of the present disclosure, there is provided a computer program configured to perform at least one of said methods.

BRIEF DESCRIPTION OF THE DRAWINGS

FIG. 4 illustrates a flow graph of a method in accordance with at least some example embodiments.

EXAMPLE EMBODIMENTS

Interconnections between cellular communication networks may be improved by the procedures described herein. More specifically, secure interconnections may be provided by using a distributed architecture, wherein different network components perform different tasks of a Security Edge Protection Proxy, SEPP. Tasks of the SEPP may be split such that a control plane SEPP, SEPP-cp, performs for example an initial handshake and negotiates security and protection policy parameters over a control plane interface, like N32-c, while a user plane SEPP, SEPP-up, may be used for forwarding communication between Network Functions, NFs, over a forwarding interface, like N32-f. A SEPP-cp and a SEPP-up of a first Public Land Mobile Network, PLMN, may further share forwarding interface contexts, like N32-f contexts, such as to enable the SEPP-up to know the N32-f contexts that have been established by the SEPP-cp and the SEPP-up to send or receive messages to/from the peer SEPP over the N32-f in accordance with the security and protection policies negotiated by the SEPP-cp with the peer SEPP and using the peer N32-f addressing told by the SEPP-c.

Thus, independent scaling for traffic on the control plane and for traffic on the forwarding interface is enabled along with independent localization of the SEPP-cp and SEPP-up. Moreover, security is enhanced as a loss or overload of the SEPP-up does not put the SEPP-cp at risk. Interconnections between PLMNs may be therefore enhanced by splitting the tasks of the SEPP.

Figure 1:
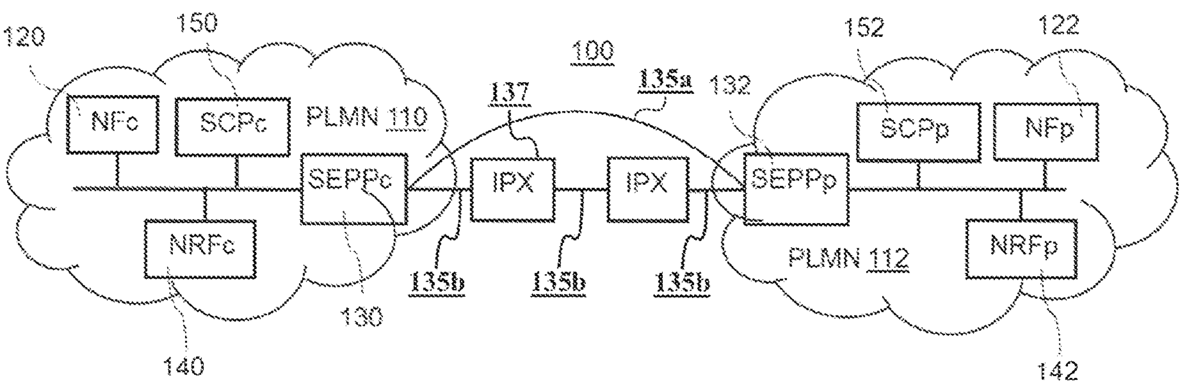
FIG. 1 illustrates a communication system in accordance with at least some example embodiments.

FIG. 1 illustrates a communication system in accordance with at least some example embodiments of the present disclosure. The exemplary system of FIG. 1 comprises two Public Land Mobile Networks, PLMNs, 110 and 112, each equipped with at least one NF, 120 and 122, respectively. An NF may refer to an operational and/or a physical entity. An NF may be a specific network node or element, or a specific function or set of functions carried out by one or more entities, such as Virtual Network Functions, VNFs. One physical node may be configured to perform tasks of multiple NFs. Examples of such NFs include a (radio) access or mobility management function, session management or control function, interworking, data management or storage function, authentication function or a combination of one or more of these functions.

In case of a 3rd Generation Partnership Project, 3GPP, Service-Based Architecture, SBA, of 5G core networks, NFs may comprise at least some of an Access and Mobility Function, AMF, a Session Management Function, SMF, a Network Slice Selection Function, NSSF, a Network Exposure Function, NEF, a Network Repository Function, NRF, an Unified Data Management, UDM, an User Data Repository, UDR, an Unstructured Data Storage Function, UDSF, an Authentication Server Function, AUSF, a Policy Control Function, PCF, an Application Function, AF, Operations Administration and Maintenance, OAM, and Network Data Analysis Function, NWDAF.

An inter-PLMN interconnection allows secure communication between a service-consuming NF and a service-producing NF, referred to as a NFc 120 and a NFp 122 in FIG. 1, respectively. Service Communication Proxies, SCPs, 150 and 152 may be deployed for indirect communication between network functions. SCPs 150 and 152 may be intermediate functions/elements for assisting in routing of messages, such as control plane messages like Diameter Routing Agent, DRA, messages between NFs.

PLMNs 110 and 112 may further comprise a Security Edge Protection Proxy, SEPP, 130 and 132, respectively. SEPPs 130 and 132 may be configured to operate as a security edge node or gateway. SEPPs 130 and 132 may communicate with each other via interfaces 135*a* and 135*b*. Interface 135*a* may be a control plane interface between SEPPs 130 and 132, such as N32-c interface, while interface 135*b* may be a forwarding interface between SEPPs 130 and 132, such as N32-f interface. Control plane interface 135*a* may be for performing initial handshake and negotiating the security and protection policy parameters, e.g., to be applied for forwarding of Hypertext Transfer Protocol, HTTP, messages over forwarding interface 135*b*. Forwarding interface 135*b* may be for forwarding the communication between, e.g., NFc 120 and NFp 122, after applying transport level (e.g. Transport Layer Security, TLS) or application level (e.g. PRotocol for N32 INterconnect Security, PRINS) security protection. The NFs may communicate with each other using representational state transfer Application Programming Interfaces, APIs. These may be known as Restful APIs.

For example in a 5G core network architecture, SEPPs 130 and 132 may be non-transparent proxies which support message filtering and policing on inter-PLMN control plane interfaces along topology hiding. SEPPs 130 and 132 may act as a service relay between the NFc 120 and NFp 122 and apply the above functionality to every control plane message in inter-PLMN signalling. Inter-PLMN signalling between SEPPs 130 and 132 may pass via one or more IP eXchange, IPX, entities 137.

As an example, detailed functionality of SEPPs, related flows and the N32 reference point, may be specified in 3GPP TS 33.501 and 3GPP TS 29.573. The N32 interface may be used, e.g., between SEPPs of a visitor PLMN and a home PLMN in roaming scenarios. The N32 interface may be logically designed as 2 separate interfaces such that N32-c is a control plane interface and N32-f may be a forwarding interface between the SEPPs.

Resiliency, scalability and load balancing of NF services, for example in 5G SBA, may be supported by exploiting a concept of an NF set, wherein the NF set may comprise functionally equivalent and inter-changeable NF instances. The concept of the NF set may be supported for all NF types and NFs belonging to a set may register in their profiles in the NRF an identity of the NF set they belong to, which may be leveraged by an HTTP client or an SCP to discover alternative NFs in the set, e.g., if they cannot communicate any longer with a specific NF instance.

In some example embodiments, a SEPP may be defined, for example by 3GPP, as a stateful network entity, the SEPP may be deployed distributed, redundant, stateless, and scalable, possibly and with the NF set concept, e.g., in accordance with 3GPP TS 23.501, section 5.21.0. A SEPP may be configured with a peer SEPP Fully Qualified Domain Name, FQDN, and use the same FQDN to create connections over a control plane interface, like N32c, and forwarding interface, like N32f. Such a solution would cause various issues though.

In general, implementations using a distributed architecture, e.g., exposing different SEPP endpoints for N32-c and N32-f connections, and different N32-f endpoints for different N32-c connections, should be enabled. For instance, it should be possible for a SEPP to have different FQDNs for a control plane interface, like N32c, than a forwarding interface, like N32f, so that the endpoints can be located and scaled separately. Also, independent traffic load share from N32-c and other N32-f connections should be supported separately based on the traffic between the PLMNs. Therefore, there should be a solution required for negotiating a FQDN of the forwarding interface with a remote SEPP over N32-c interface.

Moreover, a remote SEPP should be able to support multiple identities of one PLMN and all supported PLMN identities, like PLMN ID1, PLMN ID2, PLMN ID3, may be returned to an initiating SEPP via capability negotiation message. As a FQDN of a SEPP may be built based on an identity of a PLMN, there should be a solution for building a FQDN of a forwarding interface of a peer SEPP N32f via received PLMN identities, like PLMN ID1, PLMN ID2, PLMN ID3.

In addition, a roaming hub supporting and connecting multiple PLMNs may be introduced in upcoming 3GPP releases. Such a roaming hub may need to support a separate forwarding interface, like a N32-f, (FQDN) service. For instance, the roaming hub may need to handle traffic from more than 100 PLMNs. Therefore, using the same configuration of a FQDN for the control plane interface and the forwarding interface may not be sufficient for roaming hub deployment. If an initiating SEPP negotiates the FQDN for the forwarding plane interface with the roaming hub, then the roaming hub should be able to direct the user plane traffic over the forwarding plane interface to a less loaded service instance at the roaming hub or optimally located service instance, e.g., to a service being closer to the peer SEPP.

NF discovery procedures via an NRF may not be applicable, without further enhancements, for discovering SEPPs of PLMNs of roaming partners, as it may require to send an NF discovery request to a remote PLMN before remote SEPPs are discovered. Therefore, the NF discovery request would need to be sent before a control plane interface and a forwarding plane interface connections are set up, which is not possible. Additionally, a SEPP of a given PLMN should be able to inform a SEPP of a remote PLMN over the control plane interface about alternate SEPPs with which it shares SEPP contexts. Hence, SEPPs should be able to provide support across PLMNs, e.g., over the N32-c and N32-f interfaces, when an NF or SCP needs to discover another SEPP than its local SEPP, i.e., a SEPP from the same PLMN. In addition, if a SEPP which performed a control plane handshake procedure, like N32-c handshake procedure goes down (e.g. failure, scale-in), it should be possible to avoid an interruption of forwarding of traffic over the forwarding interface.

Furthermore, splitting of SEPP functionalities for control plane and forwarding interfaces should be supported to enable independent scaling of a SEPP-cp for the control plane interface (small amount of traffic), and SEPP-up for the forwarding interface (high traffic). Moreover, independent localization of the SEPP-cp for the control plane interface (e.g. central) and SEPP-up for the forwarding interface (e.g. several instances at different PLMN edge locations, like West china, East China, North China) should be enabled. Also, loss and/or overload of a SEPP for traffic on the forwarding interface should not put a SEPP at risk for traffic on the control plane interface, which could result in breaking all the forwarding interfaces and associated connections.

Moreover, there should be SEPP redundancy for traffic on the control plane interface and the forwarding interface so that a loss of an SEPP for a given control plane interface, like N32-c, context would not result in breaking all forwarding plane interfaces and associated connections established with this SEPP. Similarly, a loss of a SEPP for a given forwarding interface connection, like N32-f, should not result in interrupting the transfer on all the control plane interfaces. It should also be possible to balance load across multiple forwarding interface connections for a given control plane interface connection, e.g., by negotiating only once the security policies between the two PLMNs. Moreover, dynamic instantiation/de-instantiation of a SEPP for traffic on the forwarding interface and/or traffic on the control plane interface should be possible without requiring renegotiation of security policies.

Embodiments of the present disclosure therefore provide a concept of a split SEPP functionality, wherein a SEPP control plane (control plane interface, like N32-C) and SEPP user plane (forwarding interface, N32-f) are split for independent resiliency, scaling, localization, thereby enhancing interconnection between PLMNs. According to some example embodiments, control plane interface extensions may be provided to enable advertising and updating a list of alternative SEPPs for the control plane interface and/or the forwarding interface. In some example embodiments, a solution is proposed for building a FQDN of the forwarding interface based on a negotiated identity of a PLMN.

Figure 2:
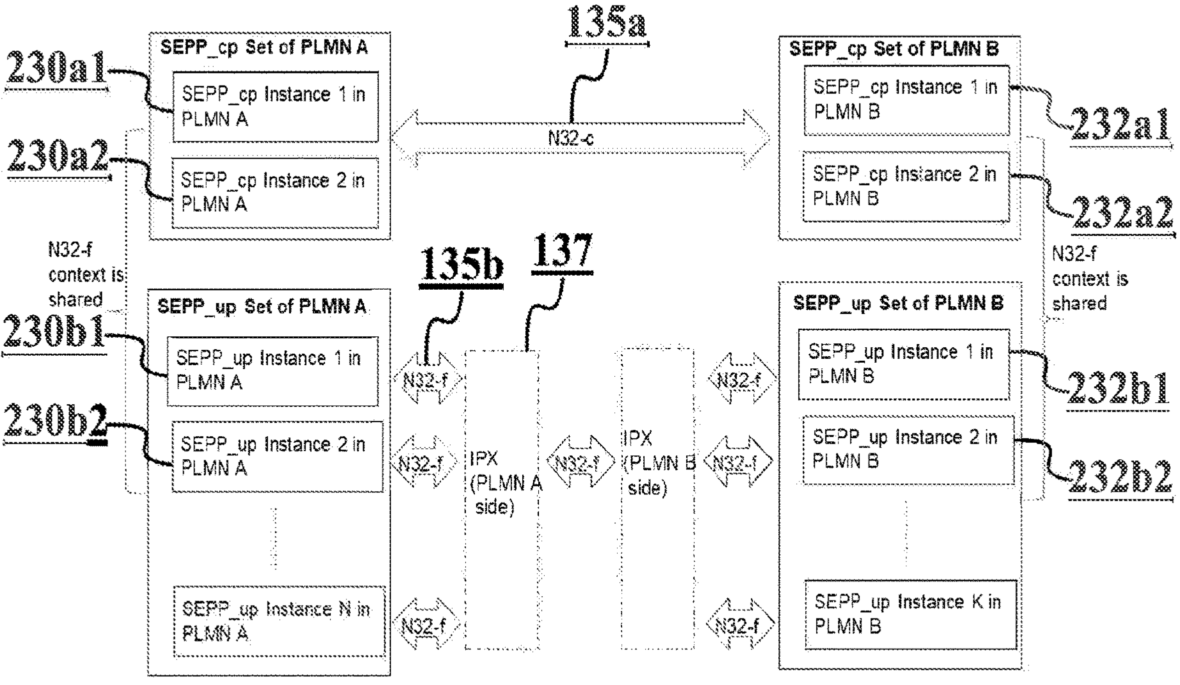
FIG. 2 illustrates an architecture in accordance with at least some example embodiments.

FIG. 2 illustrates an architecture in accordance with at least some example embodiments. More specifically, FIG. 2 shows first control plane SEPP, SEPP-cp, 230*a*1 and second SEPP-cp 230*a*2 of a first PLMN, such as PLMN 110 shown in FIG. 1, and first user plane SEPP, SEPP-up, 230*b*1 and second SEPP-up 230*b*2 of the first PLMN. FIG. 2 also shows first SEPP-cp 232*a*1, second SEPP-cp 230*a*2, first SEPP-up 232*b*1 and second SEPP-cp 232*b*2 of a second PLMN, such as PLMN 112 shown in FIG. 1. For instance, first SEPP-cp 230*a*1 and first SEPP-up 230*b*1 of the first PLMN may together perform functionalities of SEPPc 130 shown in FIG. 1 while first SEPP-cp 232*a*1 and first SEPP-up 232*b*1 of the second PLMN may together perform functionalities of SEPPp 132.

Hence, SEPPs for control plane, like N32-c interface, may be separated from SEPPs for user plane, like N32-f interface, for independent scaling, resiliency and localization. In some example embodiments, SEPP-cps and SEPP-ups may have resiliency support with the SET concept. The SET concept may refer to a SBA term through which resiliency will be achieved. For instance, NF/SEPP instances of the same SET may share the context so that if any of said instances is down, another NF/SEPP instance of the SET may take over. That is, an NF/SEPP SET may be a set of functionally equivalent and interchangeable NFs/SEPPs that share context data, to achieve scalability, resiliency and load sharing.

SEPP-cps and SEPP-ups of one PLMN may share the same forwarding interface context, such as N32-f context. For instance, first SEPP-cp 230*a*1 may be configured to operate as a control plane SEPP in the first PLMN without being configured to operate as a SEPP for user plane. First SEPP-cp 230*a*1 may further share, with a user plane SEPP of the first PLMN, like first SEPP-up 230*b*1 and/or second SEPP-up 230*b*2, a forwarding interface context, like N32-f, to at least one other SEPP in the second PLMN, like first SEPP-up 232*b*1 and/or second SEPP-up 232*b*2. Moreover, first SEPP-cp 230*a*1 may communicate, over a control plane interface, like N32-c, with a control plane SEPP of the second PLMN, like first SEPP-cp 232*a*1 and/or second SEPP-cp 232*a*2, without being configured to communicate to the second PLMN for user plane.

Similarly, first SEPP-up 230*b*1 may be configured to operate as a user plane SEPP in the first PLMN without being configured to operate as a SEPP for control plane and share, with a control plane SEPP of the first PLMN, like first SEPP-cp 230*a*1 and/or second SEPP-cp 230*a*2, the forwarding interface context to the at least one other SEPP in the second PLMN.

A SEPP-up of the first PLMN, such as first SEPP-up 230*b*1 and/or second SEPP-up 230*b*2, may communicate over the forwarding interface, with one or multiple IPX servers 137 involved in between. That is, in presence of IPX 137 in the path, there may be multiple IPX 137 on a side of the first PLMN (on a PLMN A side) and each SEPP user plane instance of the PLMN A may select an IPX independently. Similarly, there may be multiple IPX servers 137 on a side of the second PLMN (on a PLMN B side) and each SEPP user plane instance of the PLMN B may select an IPX independently.

Sharing of the forwarding interface context, like N32-f context that is created during a N32-c connection setup, may be realized by a new interface, e.g. a new API, between for example first SEPP-cp 230*a*1 and first SEPP-up 230*b*1. That is, first SEPP-cp 230*a*1 may share the forwarding interface context via a direct interface between first SEPP-cp 230*a*1 and first SEPP-up 230*b*1.

Alternatively, sharing of the forwarding interface context may be realized by first SEPP-cp 230*a*1 and first SEPP-up 230*b*1 accessing the same forwarding interface contexts, e.g., using a UDSF or UDR database. For instance, first SEPP-cp 230*b*1 may create forwarding interface contexts in the database, and first SEPP-up 230*b*1 may be notified about new, modified or released forwarding interface contexts by the UDSF. Alternatively, or in addition, first SEPP-up 230*b*1 may retrieve the forwarding contexts from the UDSF. That is, first SEPP-cp 230*a*1 may share the forwarding interface context with first SEPP-up 230*b*1 via a database and first SEPP-up 230*b*1 may receive a notification from the database about a new, modified or released forwarding interface context.

In some example embodiments, NRF APIs (used to register NF profiles and discover NFs) may be extended to enable the registration and discovery of SEPP-cps and/or SEPP-ups. Such extended NRF APIs may be used by for example by an NFc or an SCP to discover a local SEPP-up for inter-PLMN traffic, or by SEPP-cp to discover SEPP-up(s).

In some example embodiments, message exchange over the control plane interface between SEPPs may be extended to enable advertising and updating list of alternative SEPPs for the control plane interface and/or the forwarding interface, e.g., N32-c and/or N32-f, respectively.

In some example embodiments, the N32-c handshake procedure may be extended by advertising a list of SEPP-ups associated with the N32-c connection. For instance, a new attribute, a list of SEPP-ups (e.g., seppUpList) may be added to both, the request and the response, in the N32-c security capability negotiation procedure. That is, for example first SEPP-cp **230*a*1 may transmit a list of user plane SEPP-ups of the first PLMN (PLMN A), the list comprising for example first SEPP-up 230*b*1 and second SEPP-up 230*b*2, during a control plane security capability negotiation procedure. Alternatively, or in addition, first SEPP-cp 230*a*1 may receive a list of SEPP-ups of the second PLMN (PLMN B), the list comprising for example first SEPP-up 232*b*1 and second SEPP-up 232*b*2**, during the control plane security capability negotiation procedure.

For instance, the request (e.g., SecNegotiateReqData) and the response (e.g., SecNegotiateRspData) may be defined in 3GPP TS 29.573, in Tables 6.1.5.2.2-1, 6.1.5.2.3-1, and comprise an attribute related to the list of SEPP-ups as shown in Table 1.

TABLE 1 a list of user plane SEPPs

| Attribute name | Data type | P | Cardi-nality | Description |
|---|---|---|---|---|
| seppUpList | Array(Fqdn) | C | 1 . . . N | Indicates the FQDNs of the User Plane SEPPs. |

Alternatively, or in addition, a new attribute, a FQDN of a user plane SEPP (seppUpSrvFqdn) may be added to both, the request and the response, in the N32-c security capability negotiation procedure. That is, for example first SEPP-cp **230*a*1 may transmit a FQDN of a user plane SEPP, comprising for example a FQDN of first SEPP-up 230*b*1 or second SEPP-up 230*b*2, during a control plane security capability negotiation procedure. Alternatively, or in addition, first SEPP-cp 230*a*1 may receive a FQDN of a user plane SEPP, comprising for example a FQDN of first SEPP-up 232*b*1 or second SEPP-up 232*b*2**, during the control plane security capability negotiation procedure.

In some example embodiments, the FQDN of the user plane SEPP may comprise a service FQDN (may require Domain Name System, DNS, Service, SRV, resolution), which may be added to the request (SecNegotiateReqData) and/or the response (SecNegotiateRspData). The seppUpSrvFqdn (i.e. fqdn of the SEPP-up) with DNS resolution may resolve to FQDNs of the user plane SEPPs.

In some example embodiments, alternative SEPP-cps may be advertised for a connection over the control plane interface, like N32-c connection. For instance, a new attribute, a list of backup SEPP-cps (backupSeppCpList) may be added to both, the request and the response, in the N32-c security capability negotiation procedure. That is, for example first SEPP-cp **230*a*1 may transmit a list of backup control plane SEPP-cps, the list comprising for example second SEPP-cp 230*a*2, during a control plane security capability negotiation procedure. Alternatively, or in addition, first SEPP-cp 230*a*1 may receive a list of backup control plane SEPP-cps, the list comprising for example first SEPP-cp 232*a*1 and/or second SEPP-cp 232*a*2**, during the control plane security capability negotiation procedure.

For instance, the request (e.g., SecNegotiateReqData) and the response (e.g., SecNegotiateRspData) may be defined in 3GPP TS 29.573, in Tables 6.1.5.2.2-1 and 6.1.5.2.3-1 and comprise an attribute related to the list of backup control plane SEPPs as shown in Table 2.

TABLE 2 a list of backup control plane SEPPs

| Attribute name | Data type | P | Cardi-nality | Description |
|---|---|---|---|---|
| backupSeppCpList | Array(Fqdn) | C | 1 . . . N | Indicates the FQDNs of the backup Control Plane SEPPs. |

Alternatively, or in addition, a new attribute, a FQDN of a backup control plane SEPP (backupSeppCpSrvFqdn) may be added to both, the request and the response, in the N32-c security capability negotiation procedure. That is, for example first SEPP-cp **230*a*1 may transmit a FQDN of a backup SEPP-cp, comprising for example a FQDN of second SEPP-cp 230*a*2, during a control plane security capability negotiation procedure. Alternatively, or in addition, first SEPP-cp 230*a*1 may receive a FQDN of a backup SEPP-cp, the list comprising for example a FQDN of first SEPP-cp 232*a*1 and/or second SEPP-cp 232*a*2**, during the control plane security capability negotiation procedure.

In some example embodiments, the FQDN of the backup control plane SEPP may comprise a service FQDN (may require DNS SRV resolution), which may be added to the request (SecNegotiateReqData) and/or the response (SecNegotiateRspData). The backupSeppCpSrvFqdn (i.e. fqdn of the backup SEPP-cp) with DNS resolution may resolve to FQDNs of the backup Control Plane SEPPs.

In some example embodiments, alternative SEPPs may be advertised for both, control plane interface (e.g., N32-c connections) and forwarding interface (e.g., N32-f connections), for SEPPs that support both SEPP-cp and SEPP-up functionalities. That is, for example first SEPP-cp **230*a*1 may advertise SEPPs of the first PLMN, like SEPPc 130 of first PLMN 110**, wherein said SEPPs may be configured to support functionalities of control plane SEPPs and user plane SEPPs.

For instance, a new attribute a list of backup SEPPs (backupSeppList) may be added to both, the request and the response, in the N32-c security capability negotiation procedure. That is, for example first SEPP-cp **230*a*1 may transmit a list of backup SEPP-cps, the list comprising for example SEPP 130 configured to support both, control and user plane, during a control plane security capability negotiation procedure. Alternatively, or in addition, first SEPP-cp 230*a*1 may receive a list of backup SEPPs, the list comprising for example SEPP 132** configured to support both, control and user plane, during the control plane security capability negotiation procedure.

For instance, the request (e.g., SecNegotiateReqData) and the response (e.g., SecNegotiateRspData) may be defined in 3GPP TS 29.573, in Tables 6.1.5.2.2-1 and 6.1.5.2.3-1 and comprise an attribute related to the list of backup SEPPs as shown in Table 2.

TABLE 3 a list of backup SEPPs

| Attribute name | Data type | P | Cardi-nality | Description |
|---|---|---|---|---|
| backupSeppList | Array(Fqdn) | C | 1 . . . N | Indicates the FQDNs of the backup SEPPs. |

Alternatively, or in addition, a new attribute, a FQDN of a backup SEPP (backupSeppSrvFqdn) may be added to both, the request and the response, in the N32-c security capability negotiation procedure. That is, for example first SEPP-cp **230*a*1 may transmit a FQDN of a backup SEPP, like a FQDN of SEPP 130, during a control plane security capability negotiation procedure. Alternatively, or in addition, first SEPP-cp 230*a*1 may receive a FQDN of a backup SEPP, like a FQDN of SEPP 132**, during the control plane security capability negotiation procedure. The backupSeppSrvFqdn (i.e. fqdn of the backup SEPP-cp) with DNS resolution may resolve to FQDNs of the backup SEPPs that support both SEPP-cp and SEPP-up functionalities.

In some example embodiments, alternative SEPPs that support both SEPP-cp and SEPP-up functionalities may be advertised without requiring to split the SEPP into an SEPP-cp and SEPP-up, i.e., it is a useful enhancement to an architecture without such splitting. A requirement may be that SEPPs from a same PLMN to share the same forwarding context, like N32-f contexts.

When a SEPP has advertised alternative SEPPs, SEPP-up and/or SEPP-cp, another remote SEPP may receive and send traffic over a control plane interface and/or user plane interface to any of the advertised SEPPs, at any time, without requiring to re-establish a connection over a control plane interface, like an N32-c connection, and renegotiating the security and protection policies.

In some example embodiments, the following text, or a part of it, may be added for example to 3GPP TS 23.003, e.g., as a new section 28.3.2.2. x, SEPP N32f FQDN:

The SEPP N32-f Fully Qualified Domain Name (SEPP N32-f FQDN) contains an Operator Identifier that shall uniquely identify the PLMN where the SEPP is located. The SEPP N32-f FQDN is composed of seven labels. The last two labels shall be "3gppnetwork.org". The third and fourth labels together shall uniquely identify the PLMN. The first two labels shall be "sepp.n32f". The result of the N3IWF FQDN will be:

"sepp.n32f.mnc<MNC>.mcc<MCC>.pub.3gppnetwork.org"

If there are only 2 significant digits in the MNC, one "0" digit shall be inserted at the left side to fill the 3 digits coding of MNC in the SEPP N32-f FQDN.

As an example, the Operator Identifier based SEPP N32-f FQDN for MCC 345 and MNC 12 is coded in the DNS as:

"sepp.n32f.mnc012. mcc345. pub.3gppnetwork.org".

Based on received PLMN Id from the remote SEPP, the SEPP shall build the peer SEPP N32f fqdn based on the rules defined above.

Embodiments of the present disclosure therefore improve interconnections between cellular communication networks, for example by splitting of SEPP functionalities into a SEPP-cp (e.g., for N32-c traffic) and SEPP-up (e.g., for N32-f traffic). Advantages of such splitting comprise at least the following:

Said splitting of SEPP functionalities allows independent scaling of SEPP-cp for the control plane interface, like N32-c, for small traffic and SEPP_up for the forwarding interface, like N32-f, for high traffic;

Said splitting of SEPP functionalities allows independent localization of a SEPP-cp for the control plane interface (e.g. central) and SEPP-up for the forwarding interface, at several instances at different PLMN edge locations (distributed). For example, a SEPP-cp for N32-c may be in Central China whereas a SEPP-up for N32-f may be in different PLMN edge locations, like West china, East China, North China, etc.;

A loss and/or overload of a SEPP-up would result in breaking of all forwarding interface connections without splitting of SEPP functionalities. But if the SEPP functionalities are split, a loss and/or overload of a SEPP-up does not put at risk a SEPP-cp;

Said splitting of SEPP functionalities enables SEPP redundancy, e.g., for N32-c and/or N32-f traffic:

According to some example embodiments, loss of an SEPP for a given control plane interface context does not result in breaking of all control plane interface connections established with this SEPP and loss of a SEPP for a given forwarding interface connection does not result in interrupting the forwarding interface transfer. Moreover, load balancing may be enabled across multiple forwarding interface connections for a given control plane interface connection with negotiating only once the security policies between the two PLMNs.

According to some example embodiments, dynamic instantiation and/or de-instantiation of a SEPP may be enabled for traffic on the forwarding interface traffic and/or traffic on the control plane interface, without requiring renegotiation of security policies. Also, a distributed SEPP architecture is possible and a FQDN of the forwarding interface may be separated from a FQDN of the control plane interface. In some example embodiments, a FQDN of the forwarding interface may be negotiated over the control plane interface.

Figure 3:
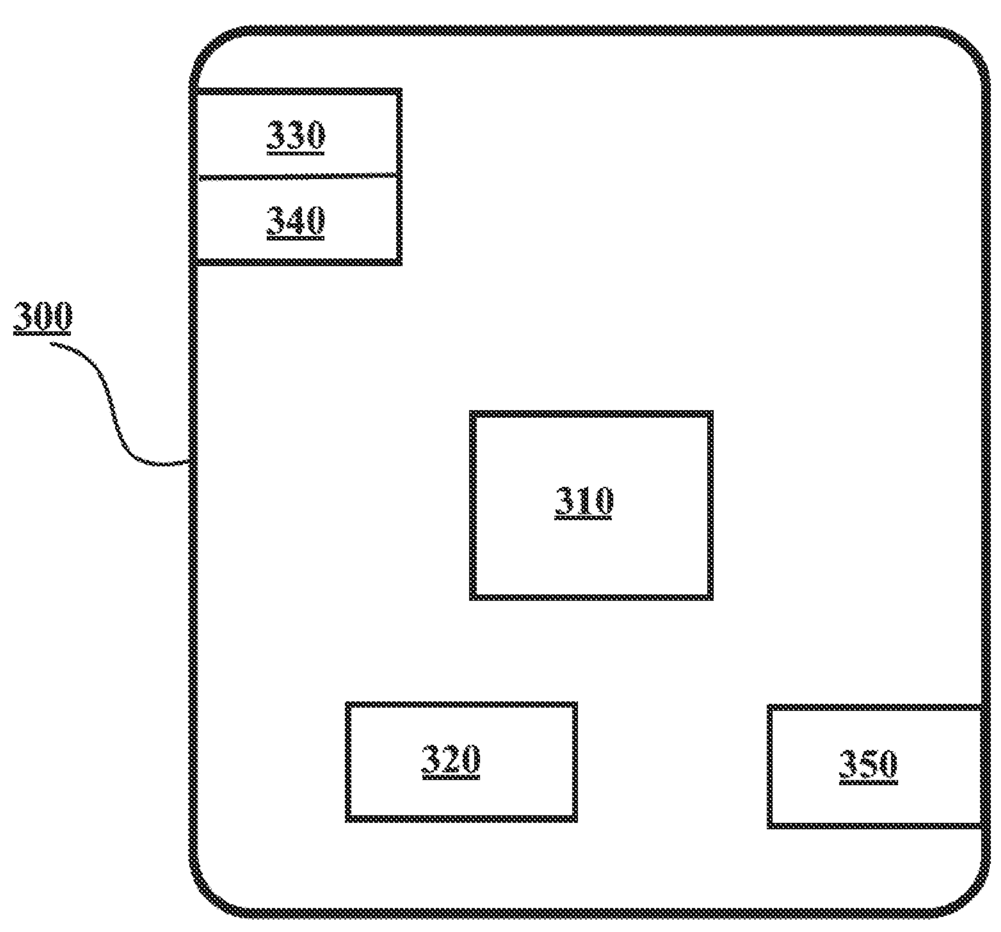
FIG. 3 illustrates an example apparatus capable of supporting at least some example embodiments.

FIG. 3 illustrates an example apparatus capable of supporting at least some example embodiments. Illustrated is device 300, which may comprise, for example, SEPP-cp of the first PLMN, **230*a*1 or 230*a*2, SEPP-up of the first PLMN, 230*b*1 or 230*b*2, or a device controlling functioning thereof. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. Processor 310 may comprise at least one Application-Specific Integrated Circuit, ASIC. Processor 310 may comprise at least one Field-Programmable Gate Array, FPGA. Processor 310 may comprise an Intel Xeon processor for example. Processor 310 may be means for performing method steps in device 300, such as determining, causing transmitting and causing receiving. Processor 310** may be configured, at least in part by computer instructions, to perform actions.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a network function, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular standard, such as a standard defined by the 3GPP. Transmitter 330 may comprise more than one transmitter. Receiver 340 may comprise more than one receiver. Transmitter 330 and/or receiver 340 may be configured to operate in accordance with a suitable communication standard.

Device 300 may comprise User Interface, UI, 350. UI 350 may comprise at least one of a display, a keyboard, a touchscreen, a vibrator arranged to signal to a user by causing device 300 to vibrate, a speaker and a microphone. A user may be able to operate device 300 via UI 350, for example to configure device 300 and/or functions it runs.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. In some example embodiments, device 300 lacks at least one device described above. For example, device 300 may not have UI 350.

Processor 310, memory 320, transmitter 330, receiver 340 and/or UI 350 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the example embodiment various ways of interconnecting at least two of the aforementioned devices may be selected without departing from the scope of the present disclosure.

FIG. 4 is a flow graph of a first method in accordance with at least some example embodiments. The phases of the illustrated first method may be performed by an apparatus, such as SEPP, like SEPP-cp of the first PLMN, 230*a*1 or 230*a*2, or by a control device configured to control the functioning thereof, possibly when installed therein.

The first method may comprise, at step 410, transmitting to a second security edge protection proxy (SEPP) of a second public land mobile network (PLMN), in a control plane signaling procedure, addressing information of a first SEPP of a first PLMN, to be used by the second SEPP for forwarding messages from the second PLMN to the first PLMN and receive from the second SEPP of the second PLMN, in the control plane signaling procedure, addressing information of the second SEPP of the second PLMN, to be used by the first SEPP for forwarding messages from the first PLMN to the second PLMN.

It is to be understood that the example embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular example embodiments only and is not intended to be limiting.

Reference throughout this specification to one example embodiment or an example embodiment means that a particular feature, structure, or characteristic described in connection with the example embodiment is included in at least one example embodiment. Thus, appearances of the phrases "in one example embodiment" or "in an example embodiment" in various places throughout this specification are not necessarily all referring to the same example embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various example embodiments and examples may be referred to herein along with alternatives for the various components thereof. It is understood that such example embodiments, examples, and alternatives are not to be construed as de facto equivalents of one another, but are to be considered as separate and autonomous representations.

In an example embodiment, an apparatus, such as, for example, SEPP-cp of the first PLMN, **230*a*1 or 230*a*2, SEPP-up of the first PLMN, 230*b*1 or 230*b*2**, or a device controlling functioning thereof, may comprise means for carrying out the example embodiments described above and any combination thereof.

In an example embodiment, a computer program may be configured to cause a method in accordance with the example embodiments described above and any combination thereof. In an exemplary example embodiment, a computer program product, embodied on a non-transitory computer readable medium, may be configured to control a processor to perform a process comprising the example embodiments described above and any combination thereof.

In an example embodiment, an apparatus, such as, for example, SEPP-cp of the first PLMN, **230*a*1 or 230*a*2, SEPP-up of the first PLMN, 230*b*1 or 230*b*2**, or a device controlling functioning thereof, may comprise at least one processor, and at least one memory including computer program code, wherein the at least one memory and the computer program code are configured to, with the at least one processor, cause the apparatus at least to perform the example embodiments described above and any combination thereof.

Furthermore, the described features, structures, or characteristics may be combined in any suitable manner in one or more example embodiments. In the preceding description, numerous specific details are provided, such as examples of lengths, widths, shapes, etc., to provide a thorough understanding of example embodiments of the disclosure. One skilled in the relevant art will recognize, however, that the disclosure may be practiced without one or more of the specific details, or with other methods, components, materials, etc. In other instances, well-known structures, materials, or operations are not shown or described in detail to avoid obscuring aspects of the disclosure.

While the forgoing examples are illustrative of the principles of the example embodiments in one or more particular applications, it will be apparent to those of ordinary skill in the art that numerous modifications in form, usage and details of implementation may be made without the exercise of inventive faculty, and without departing from the principles and concepts of the disclosure. Accordingly, it is not intended that the disclosure be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some example embodiments find industrial application at least in 5G core networks, wherein it is desirable to enable interconnections between the networks, and possibly in other core networks in the future as well.

ACRONYMS LIST

3GPP 3rd Generation Partnership Project
AEF Application Exposure Function
AF Application Function
AMF Access and Mobility Function
API Application Programming Interfaces
AUSF Authentication Server Function
DNS Domain Name System
DRA Diameter Routing Agent
FQDN Fully Qualified Domain Name
IPX IP eXchange
NEF Network Exposure Function
NF Network Function
NFc NF Consumer
NFp NF Producer
NRF Network Repository Function
NSSF Network Slice Selection Function
NWDAF Network Data Analysis Function
OAM Operations Administration and Maintenance
PCF Policy Control Function
PLMN Public Land Mobile Network
PRINS Protocol for N32 Interconnect Security
QoS Quality of Service
SBA Service-Based Architecture
SCP Service Communication Proxy
SEPP Security Edge Protection Proxy
SEPP-cp control plane SEPP
SEPP-up user plane SEPP
SMF Session Management Function
SRV Service
TLS Transport Layer Security
UDM Unified Data Management
UDR User Data Repository
UDSF Unstructured Data Storage Function
VNF Virtual Network Function

REFERENCE SIGNS LIST

| | |
|---|---|
| 110, 112 | PLMNs |
| 120, 122 | NFS |
| 130, 132 | SEPPs |
| 135a | Control plane interface |
| 135b | Forwarding interface |
| 137 | IPX servers |
| 140, 142 | NRFs |
| 150, 152 | SCPs |
| 230a1, 230a2 | SEPP-cps of the first PLMN |
| 230b1, 230b2 | SEPP-ups of the first PLMN |
| 232a1, 232a2 | SEPP-cps of the second PLMN |
| 232b1, 232b2 | SEPP-ups of the second PLMN |
| 300-350 | Structure of the apparatus of FIG. 3 |
| 410-420 | Phases of the method in FIG. 4 |

We claim:

1. An apparatus comprising at least one processing core, at least one memory including computer program code, the at least one memory and the computer program code being configured to, with the at least one processing core, cause the apparatus to perform at least:

transmit to a second security edge protection proxy (SEPP) of a second public land mobile network (PLMN), in a control plane signaling procedure, addressing information of a first SEPP of a first PLMN, to be used by the second SEPP for forwarding messages from the second PLMN to the first PLMN, wherein the addressing information comprises a service fully qualified domain name comprising a domain name system service resolution; and receive from the second SEPP of the second PLMN, in the control plane signaling procedure, addressing information of the second SEPP of the second PLMN, to be used by the first SEPP for forwarding messages from the first PLMN to the second PLMN.

2. The apparatus according to claim 1, wherein the at least one memory and the computer program code are configured to, with the at least one processing core, further cause the apparatus to:

receive a message from the second SEPP via a forwarding interface by using the addressing information of the first SEPP; or transmit a message to the second SEPP via the forwarding interface by using the addressing information of the second SEPP.

3. The apparatus according to claim 1, wherein:

the control plane signaling procedure is a security capability negotiation procedure.

4. A method, comprising at least:

transmitting to a second security edge protection proxy (SEPP) of a second public land mobile network (PLMN), in a control plane signaling procedure, addressing information of a first SEPP of a first PLMN, to be used by the second SEPP for forwarding messages from the second PLMN to the first PLMN, wherein the addressing information comprises a service fully qualified domain name comprising a domain name system service resolution; and receiving from the second SEPP of the second PLMN, in the control plane signaling procedure, addressing information of the second SEPP of the second PLMN, to be used by the first SEPP for forwarding messages from the first PLMN to the second PLMN.

5. The method according to claim 4, further comprising:

receiving a message from the second SEPP via a forwarding interface by using the addressing information of the first SEPP; or transmitting a message to the second SEPP via the forwarding interface by using the addressing information of the second SEPP.

6. The method according to claim 4, wherein:

the control plane signaling procedure is a security capability negotiation procedure.

* * * * *